United States Patent
Harada

(10) Patent No.: US 6,195,511 B1
(45) Date of Patent: Feb. 27, 2001

(54) MEMORY ALTERATION SYSTEM FOR CAMERA AND ITS CONTROL METHOD

(75) Inventor: Yoshihito Harada, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/207,356

(22) Filed: Dec. 8, 1998

(30) Foreign Application Priority Data

Dec. 17, 1997 (JP) .................................................. 9-348304

(51) Int. Cl.[7] ........................... G03B 17/00; G06F 12/02; G06F 9/06
(52) U.S. Cl. .......................... 396/300; 396/439; 712/37; 711/103
(58) Field of Search .................... 396/300, 439; 712/37; 711/103

(56) References Cited

U.S. PATENT DOCUMENTS

| | | | |
|---|---|---|---|
| 4,853,733 | 8/1989 | Youji et al. | 396/300 |
| 5,278,604 | 1/1994 | Katsunori | 396/300 |
| 5,300,978 | 4/1994 | Tetsuo | 396/300 |
| 5,828,911 | * 10/1998 | Miyazawa | 396/300 X |
| 6,009,497 | * 12/1999 | Wells et al. | 711/103 |

FOREIGN PATENT DOCUMENTS 07 191364   7/1995   (JP) .

OTHER PUBLICATIONS

Patent Abstract of Japan 07191364, published Jul. 28. 1995.*
European Search Report Dated Jul. 17, 2000.*

* cited by examiner

Primary Examiner—W. B. Perkey
(74) Attorney, Agent, or Firm—Morgan & Finnegan, LLP.

(57) ABSTRACT

In a camera which mounts a microcomputer with an internal flash memory, it is impossible to arbitrarily rewrite the contents of all program areas in the flash memory.

In this invention, the flash memory is divided into a plurality of banks, and one bank holds a control program for altering the contents of the flash memory. Upon rewriting contents of this bank, the control program held in that bank is copied to the other bank, and the contents of that bank are rewritten under the control of the control program on the other bank.

51 Claims, 8 Drawing Sheets

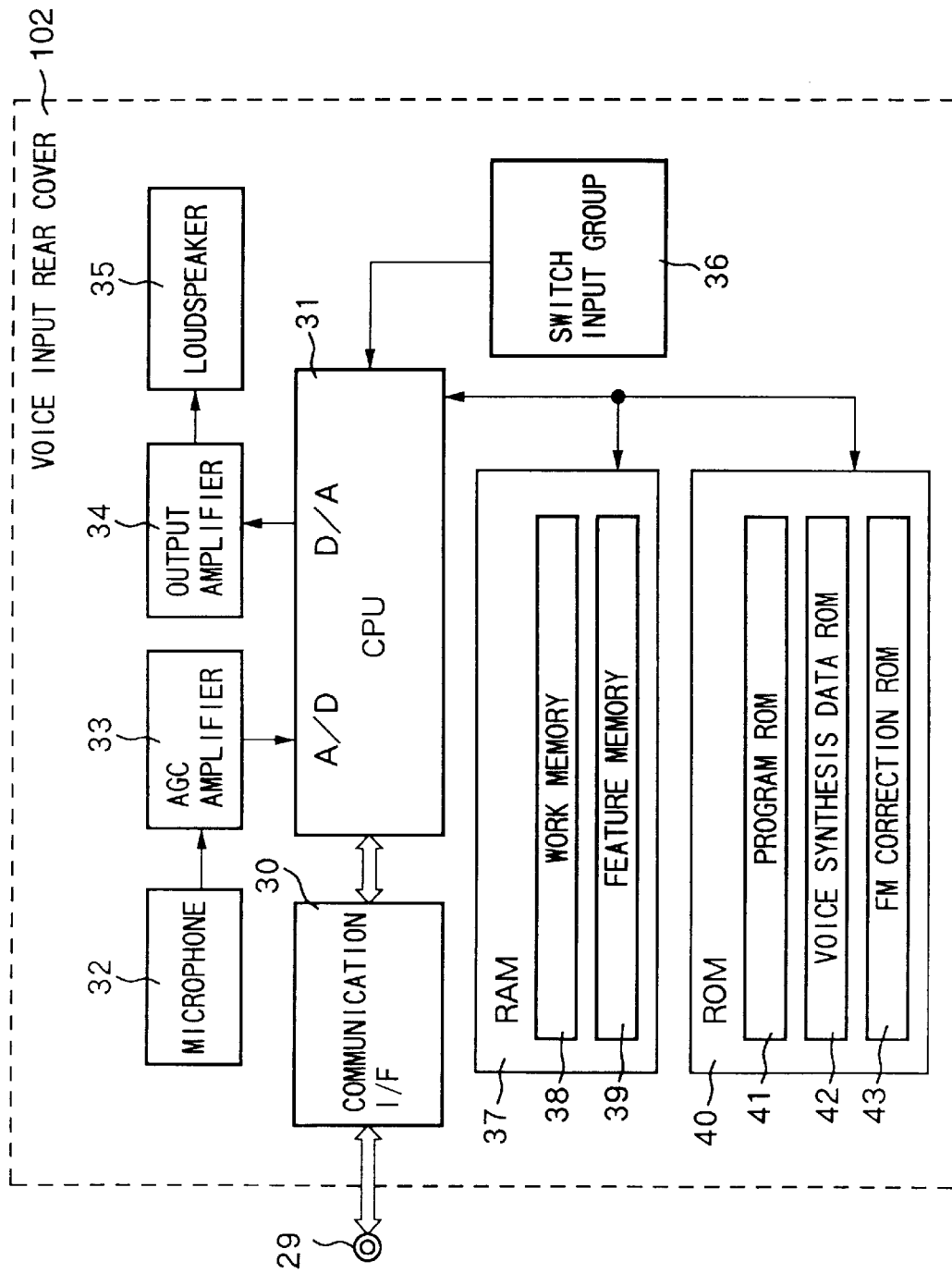

MEMORY ALTERATION SYSTEM FOR CAMERA AND ITS CONTROL METHOD

BACKGROUND OF THE INVENTION

The present invention relates to a program alteration system for a camera which incorporates a flash memory, and its control method.

Conventionally, a microcomputer mounted in a camera normally uses a mask ROM and, hence, the contents of the entire program area cannot be altered. Some cameras use a memory such as an EEPROM which is rewritable in units of bytes, and can rewrite data and parameters. However, a rewrite control program (loader) itself exists in the mask ROM. Therefore, even when data and parameters are rewritten in such camera, the loader itself is not rewritten; it is impossible to destroy the loader itself.

Recently, a microcomputer that incorporates a flash memory which can simultaneously erase the contents of its program area in units of bytes has become popular. For example, in case of a 32-bit microcomputer named V853 available from NEC corp., the entire 128-kbyte program ROM area is made up of a flash memory.

However, in V853, the loader itself is incorporated as firmware of the microcomputer. Therefore, the contents of the flash memory in the microcomputer are rewritten after the microcomputer is reset, and its mode is switched to a flash rewrite mode as one of test modes.

However, in the conventional microcomputer which incorporates the flash memory, the contents of the flash memory can be rewritten in only the mode under the control of firmware, as described above. In such mode under the control of firmware, a user program cannot run. Hence, customization such as arbitrary initialization of the I/O ports of the microcomputer by the user program cannot be attained, and it is impossible to rewrite the loader itself for the purpose of improving the function of the loader itself, which controls flash memory rewrites.

SUMMARY OF THE INVENTION

Accordingly, it is an object of the present invention to provide a memory alteration system, which can rewrite the contents of the entire program area of a flash memory incorporated in a camera, and its control method.

According to the present invention, the foregoing object is attained by providing a memory alteration system for a camera comprising storage means divided into at least two areas, wherein the at least two areas of the storage means respectively hold control programs for altering contents of the storage means, and when the control program held in one of the at least two areas is executed to alter the contents of the other area, the contents of all the areas of the storage means are altered.

With this arrangement, the degree of freedom in program alteration can be increased, and possibility of camera improvements can be widely assured.

And it is another object of the present invention to provide a memory alteration system which can automatically support a newly connected accessory in a camera which incorporates a flash memory, and its control method.

According to an aspect of the present invention, the memory alteration system further comprises connection means for connecting an external device, and data held in the external device is written in the flash memory by executing the control program.

With this arrangement, the user can easily enjoy new functions of the camera.

The invention is particularly advantageous since the contents of the entire program area on the flash memory can be rewritten in the camera which incorporates the flash memory.

Therefore, program alteration with a very high degree of freedom such as debugging for camera software, customization of display operability in units of users, updating of a flash memory rewrite control loader itself, and the like can be realized in addition to updating of a camera control program and support for a new accessory, thus widely assuring possibility of camera improvements.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 2A and 2B are block diagrams showing the arrangement of the camera system in the first embodiment;

DESCRIPTION OF THE PREFERRED EMBODIMENTS

Preferred embodiments of the present invention will now be described in detail in accordance with the accompanying drawings.

First Embodiment

Possibility of changes in camera system that can mount accessories along with developments of peripheral techniques will be described below with reference to FIGS. 1A to 1F. Referring to FIGS. 1A to 1F, a camera 100 is commonly used, and is developed simultaneously with a joystick rear cover 101 shown in FIG. 1A.

Figure 1A:
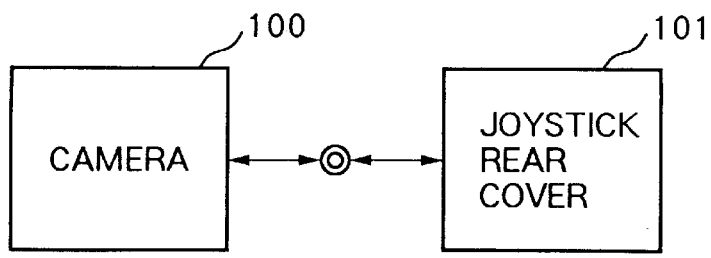
FIGS. 1A to 1F are views showing examples of camera systems according to the first embodiment of the present invention.

FIG. 1A shows an example of a system including the camera 100 and joystick rear cover 101. The camera 100 in this system is developed under the assumption of use of a joystick. For example, auto-focus (AF) distance measurement points of the camera 100 can be arbitrarily set using a joystick on the rear cover 100. In this way, AF distance measurement points of the camera can be quickly set by freely moving the joystick on the rear cover 101, which is a merit of simultaneous development of the camera 100 and rear cover 101.

Figure 1B:
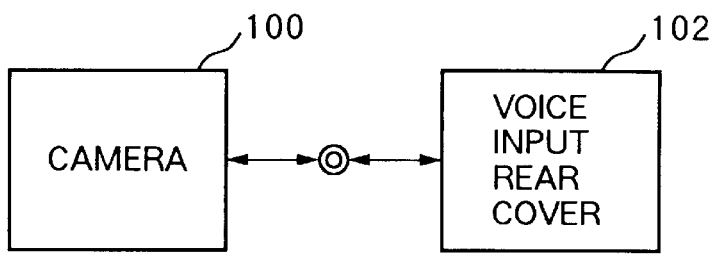

Assume that a voice input rear cover 102 shown in FIG. 1B is developed later due to advance of related techniques. That is, voice recognition techniques and semiconductor techniques advance along with the progress of time, and the use of the voice input rear cover 102 as a camera accessory becomes a reality.

However, if the advent of the voice input rear cover 102 in the future is not expected at the time of development of the camera 100 shown in FIG. 1A, the camera 100 does not support any communication protocol of the voice input rear cover 102. Hence, when a newly developed voice input rear cover 102 is mounted on the camera 100, it cannot be used. In order to use this voice input rear cover 102, the internal program of the camera 100 must be altered to install a new program corresponding to the voice input rear cover 102.

As in the aforementioned example, a new accessory which was not expected at the time of development of the camera is likely to appear along with advance of electronic technologies.

Figure 1C:
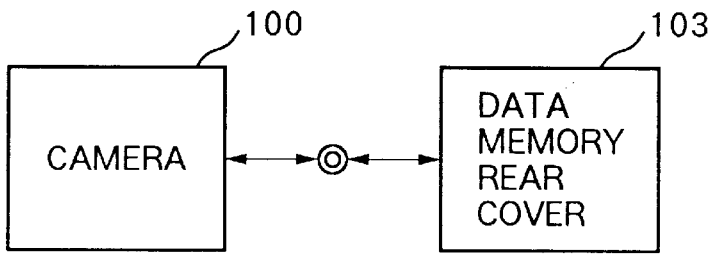
Figure 1D:
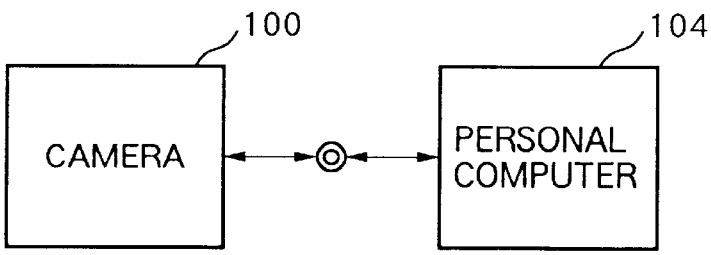

For example, when the semiconductor integration density increases and memory cost is reduced, a data memory rear cover 103 capable of holding photographing data of the camera 100 in a memory may emerge, as shown in FIG. 1C. Also, as shown in FIG. 1D, an interface with a computer may become available to connect a personal computer (to be simply referred to as a computer hereinafter) 104 to the camera 100 to output data of the camera 100 to the computer 104 or to control program alteration of the camera 100 by the computer 104.

Figure 1E:
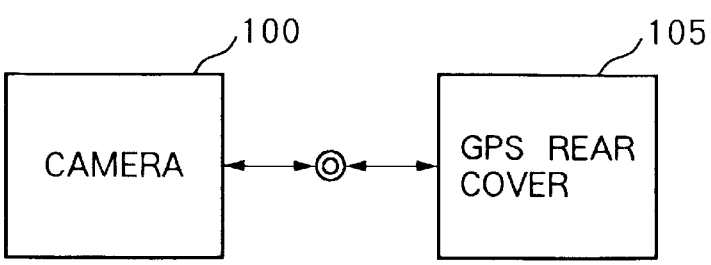
Figure 1F:
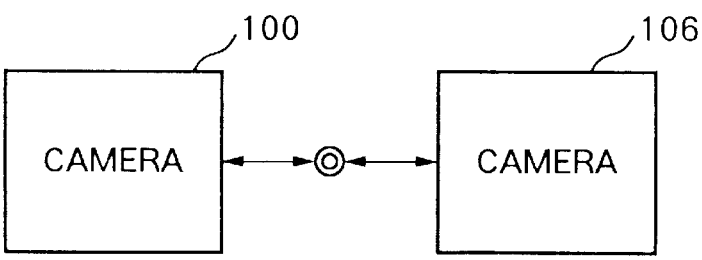

Furthermore, along with advance of signal processing techniques in satellite communications, a GPS rear cover 105 for detecting the photographing position using a satellite may appear, as shown in FIG. 1E. Moreover, as shown in FIG. 1F, tandem photographing done by connecting a plurality of cameras, or program or data copy between these cameras may become possible.

In this manner, various new accessories in the camera system are expected to appear along with the advance of techniques. However, as described above, a program held by an internal microcomputer of the camera 100 must be altered to cope with a new accessory.

As the semiconductor techniques have advanced in recent years, a microcomputer which incorporates an electrically rewritable nonvolatile memory such as a flash memory has been developed as a single-chip microcomputer: for example, MC68C916, MC68HC912, and the like available from Motorola, Inc.

When the camera 100 uses such microcomputer, the program of the camera which is already in use by the user can be altered. For example, as disclosed in Japanese Patent Laid-Open No. 7-191364, the computer and camera are connected, as shown in FIG. 1D, and the program in the camera is altered under the control of the computer.

In this way, to alter a program using a microcomputer with an internal flash memory is a state-of-the-art technique in, e.g., personal computers. Since microcomputers have become inexpensive in recent years, a microcomputer can be mounted in the camera.

In general, in a personal computer, an operating system (OS), utility, and the like are supplied via a medium such as a CD-ROM or the like, and its own control program can be altered. When new peripheral equipment such as a printer, scanner, or the like is put on the market, its device driver or the like is provided via a medium such as a floppy disk or the like to support such equipment. In this manner, the new equipment can be used in the computer system.

By altering the internal program of the camera as in the above-mentioned personal computer, the camera can cope with a new accessory. For example, a system shown in FIG. 1D is equipped in, e.g., a camera service center to alter the program of the camera brought in by the user or to alter the program of the camera by the user himself or herself using a personal computer or the like.

However, it is very troublesome for the user to bring in the camera to the service center every time he or she wants to use a new rear cover. Also, even when the user himself or herself can alter the program, it is impossible to expect for all users to do such operation.

In, e.g., a Windows 95 system that runs on a personal computer, a so-called plug-in system which can automatically support new peripheral equipment by only connecting the equipment to the computer is known. In the plug-in system, various kinds of device driver software programs are already installed in the personal computer, and an appropriate driver software program is loaded simultaneously with recognition of a new peripheral equipment connected to the computer, thus supporting that equipment.

It is, therefore, an object of this embodiment to automatically support a new accessory by mounting that accessory on a camera with an internal flash memory as in the personal computer.

In order to achieve this object, a program to be installed in the camera is held in advance in an accessory, and is transferred as data from the accessory to the camera, thereby altering the program already installed in the camera. In this fashion, the user can easily use a new accessory together with his or her camera, and can easily enjoy new functions of the camera.

Program alteration of the camera according to this embodiment will be described in detail below.

Figure 2A:
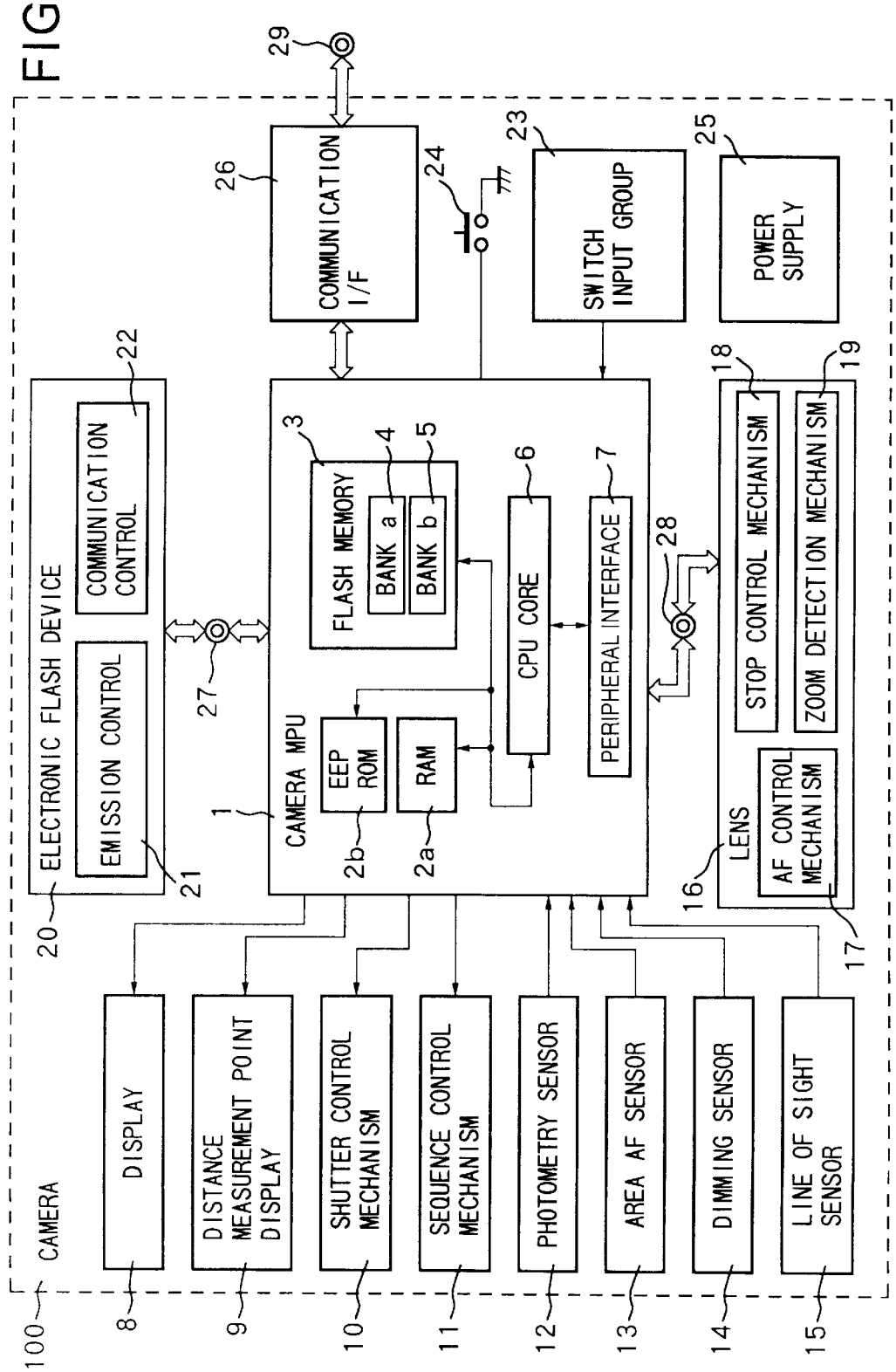

FIGS. 2A and 2B show the detailed arrangement of the camera system shown in FIG. 1B. Reference numeral 100 in FIG. 2A denotes the camera; and 104 in FIG. 2B, the voice input rear cover, which is a new accessory in this embodiment.

In the camera 100 shown in FIG. 2A, reference numeral 1 denotes a camera MPU, which serves as the center of all kinds of control in the camera 100. The camera MPU 1 comprises a CPU core 6, RAM 2a, EEPROM 2b, flash memory 3, and peripheral interfaces 7. Note that the peripheral interfaces 7 includes, e.g., a versatile I/O port, timer, PWM, A/D converter, and the like.

Note that a microcomputer such as MC68HC912 or the like mentioned above is used as the camera MPU 1 in this embodiment. Since such single-chip microcomputer can hold a program and data therein, the camera 100 does not especially have any mask ROM.

The flash memory 3 comprises a bank a 4 in which a flash rewrite control program (loader) resides, and a bank b 5 which holds a camera control program. In general, in order to rewrite the contents of the flash memory 3, the contents of one bank are cleared, and a new program must be loaded to that bank. Hence, MC68HC912 or the like has a plurality of banks.

Reference numeral 8 denotes a display such as an external LCD, an LCD in the finder, or the like, which displays the control values, mode, and the like in the camera 100. Reference numeral 9 denotes a distance measurement point display for superimpose-displaying distance measurement points; 10, a shutter control mechanism; 11, a sequence control mechanism for controlling mirror up/down movement, shutter charge, and film feeding; 12, a photometry sensor; 13, an area AF sensor having a plurality of distance measurement points; 14, a dimming sensor; and 15, a line of sight sensor for detecting one of the distance measurement points, which is caught by the line of sight of the user who looks into the finder.

Reference numeral 16 denotes a lens, which includes an AF control mechanism 17, stop control mechanism 18, zoom detection mechanism 19, and the like, and communicates with the camera MPU 1 via a lens mount contact 28. Reference numeral 20 denotes an electronic flash device, which comprises an emission control mechanism 21 and communication control mechanism 22, and communicates with the camera MPU 1 via a flash accessory shoe contact 27.

Reference numeral 23 denotes a switch input group which includes a release button, photometry button, and the like. Also, reference numeral 25 denotes a power supply in the camera. Reference numeral 26 denotes a communication interface (I/F) which controls communication with the voice input rear cover 102 as an accessory via an accessory contact 29.

Reference numeral 24 denotes an initialization switch, which is used for writing a program in the flash memory in the factory before delivery of a product. For example, in MC68HC912 above or the like, a flash write loader is sent into the RAM 2 via the communication I/F 26 by a scheme called a special boot, and is executed to write a program in the flash memory 3 via the communication I/F 26.

Once the program is written in the flash memory 3, a new program can be written without using the initialization switch 24 thereafter. That is, the contents of the bank b 5 can be rewritten via the loader by storing the loader in the bank a 4.

The voice input rear cover 102 as a new accessory will be explained below.

The voice input rear cover 102 shown in FIG. 2B recognizes the user's voice and operates the camera 100 in accordance with the voice-input operation instruction. For example, a series of operations are made in accordance with the user's voice-input instruction as follows:

The user speaks "move distance measurement point upward".

The rear cover answers "OK".

The AF distance measurement point of the camera moves upward by one step.

In order to realize such operations, in the voice input rear cover 102, a communication I/F 30 for communicating with the camera 100 via the accessory contact 29, a microphone 32 for voice input, an AGC microphone amplifier 33, an output amplifier 34 for synthesizing and outputting voice, and a loudspeaker 35 are connected to a CPU 31 via A/D and D/A converters. A switch input group 36 includes a switch used for learning speech of a specific speaker, a start SW for instructing start of power supply to the amplifiers and the like to acquire speaker's commands, and the like.

Furthermore, a RAM 37 and ROM 40 are connected to the CPU 31. The RAM 37 comprises a work RAM 38 serving as a work memory, and a feature memory RAM 39 for holding feature data of the speaker. The ROM 40 comprises a program ROM 41 for holding a control program for voice recognition, voice synthesis, communications with the camera, and the like, a synthesis data ROM 42 for holding data for voice synthesis, and an FM (flash memory) correction ROM 43 for holding a correction program (to be referred to as a camera alteration program) for the flash memory in the camera. Note that the synthesis data ROM 42 is also used as an unspecific speaker feature memory.

The FM correction ROM 43 holds all programs to be stored in the flash memory 3 in the camera MPU 1 as a camera alteration program as the characteristic feature of this embodiment. That is, the camera alteration program includes one or both a program for altering the loader in the bank a 4 in the flash memory 3 or a program for altering the camera control program in the bank b 5.

As the camera control program held as the camera alteration program in the FM correction ROM 43, for example, a program for making the camera 100 support a main function "AF distance measurement point switching by voice" of the voice input rear cover 102 itself as a new accessory, is held. In this embodiment, after the camera control program held in the FM correction ROM 43 is temporarily stored in the bank b 5 in the camera, it supports the function of the voice input rear cover 102.

Processing upon mounting the voice input rear cover 102 as a new accessory on the camera 100 in this embodiment will be explained below with reference to the flow chart in FIG. 3. Note that the processing shown in the flow chart is controlled by the camera MPU 1.

If the voice input rear cover (to be referred to as an accessory hereinafter) 102 is mounted on the camera 100 in step S101, the camera 100 communicates with the accessory 102 (S102). If the camera 100 receives a program rewrite instruction "ON" from the accessory 102 (S103), flash memory rewrite processing in step S114 and the subsequent steps is executed. On the other hand, if the camera 100 receives a program rewrite instruction "OFF" (S103), normal initialization processing in steps S104 to S114 is executed. More specifically, if the rewrite instruction is "OFF", since a communication for program alteration is not required, the communication in step S102 and the subsequent steps is not executed.

The generation timing of the program rewrite instruction by the accessory 102 in step S103 will be explained below with reference to FIG. 4. Assume that the FM correction ROM 43 in the accessory 102 stores a camera control program as a camera alteration program.

The accessory 102 acquires a version V1 of the camera control program already stored in the bank b 5 in the flash memory 3 in the camera 100 via a communication with the camera 100 (S201). In step S202, the version V1 is compared with a version V2 of a camera control program held as the camera alteration program in the FM correction ROM 43 in the accessory 102. As a result, if V1<V2, i.e., the camera alteration program in the camera 100 is a newer version, the accessory 102 cannot be supported unless the camera control program currently held in the bank b 5 in the flash memory 3 of the camera 100 is altered. In this case, the rewrite instruction of the camera control program is set "ON" in step S203, and is transmitted to the camera 100 in step S205.

On the other hand, if it is determined in step S202 that V1≧V2, i.e., the version of the camera alteration program in the accessory 102 is not newer than that in the camera, the camera control program rewrite instruction is set "OFF" (S204), and is transmitted to the camera 100.

Note that the camera control program rewrite instruction may be similarly set on the camera 100 side upon reception of the version information of the camera alteration program from the accessory 102.

Figure 4:
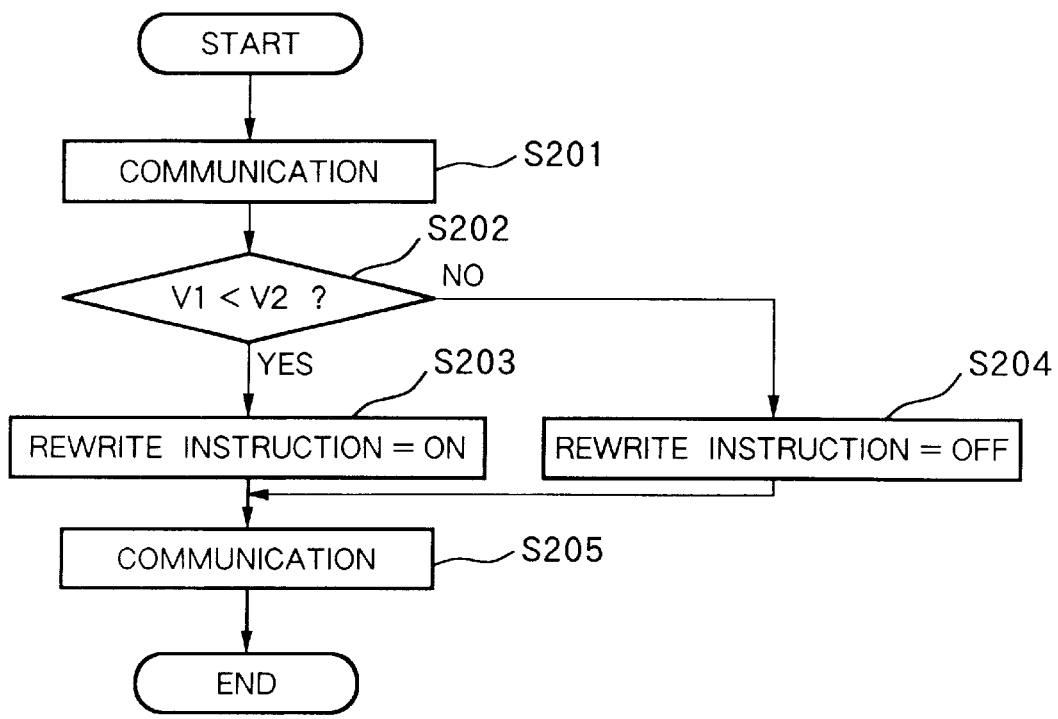
FIG. 4 is a flow chart showing generation of a program rewrite instruction in the first embodiment.

Referring to FIG. 4, a corresponding camera control program is held in the bank b 5 of the camera 100 as the camera alteration program in the accessory 102. Of course, a rewrite instruction is similarly issued even when a corresponding loader is held in the bank a 4.

Referring back to FIG. 3, if it is determined in step S103 that the program rewrite instruction is "OFF", i.e., the contents of the flash memory 3 need not be written, the camera checks as normal initialization processing if the photometry switch is ON (S104). That is, when the photometry button located at the first stroke position of the release button has been pressed in the switch input group 23 of the camera 100, line of sight detection (S105), photometry (S106), distance measurement using the area AF sensor and focus adjustment of the lens (S107), superimpose display of the TV value, AV value, distance measurement points, and the like (S108) are made. If it is determined in step S109 that the release button has not been pressed, the flow returns to step S104.

Note that the loop of steps S104 to S109 is a routine mainly executed upon depression of the photometry switch. As will be described later, when the contents of the flash memory 3 are rewritten with the program that supports the accessory 102, processing (distance measurement point instruction) for receiving an instruction for moving the distance measurement point in one of up, down, right, left, and oblique directions from the accessory 102 is also added.

If it is determined in step S109 that the release button has been pressed, mirror-up sequence control after (S110), control of the lens stop (S111), shutter control (S112), sequence control including mirror down movement, shutter charge, film feeding and the like (S113) are executed in turn, and the flow then returns to step S104.

Flash memory rewrite processing upon detection of the program rewrite instruction "ON" in step S103, as the characteristic feature of this embodiment, will be explained below.

As the program rewrite instruction in this embodiment, one of a loader rewrite instruction for the bank a 4 in the flash memory 3 in the camera 100 and a program rewrite instruction for the bank b 5 is generated. That is, one of these instructions is determined depending on whether the camera alteration program held by the FM correction ROM 43 is the one for rewriting the loader or for rewriting the control program.

It is checked in step S114 if the rewrite target of the camera alteration program is the bank b 5 that holds the control program of the camera 100. If the rewrite instruction is the one for the bank b 5, the contents of the bank b 5 are rewritten in step S118. The rewrite control at that time is done by the loader held in advance in the bank a 4.

On the other hand, if the rewrite instruction is the one for bank a 4, the flash rewrite program, i.e., the loader, held in the bank a 4 is copied to the bank b 5 in step S115, and the rewrite control is passed to the loader in the bank b 5 in step S116. With this control, the loader itself in the bank a 4 can be prevented from destroying the bank a 4 as its own execution area, i.e., the loader program can be avoided from running away. Then, the contents of the bank a 4 are rewritten in step S117.

Figure 5:
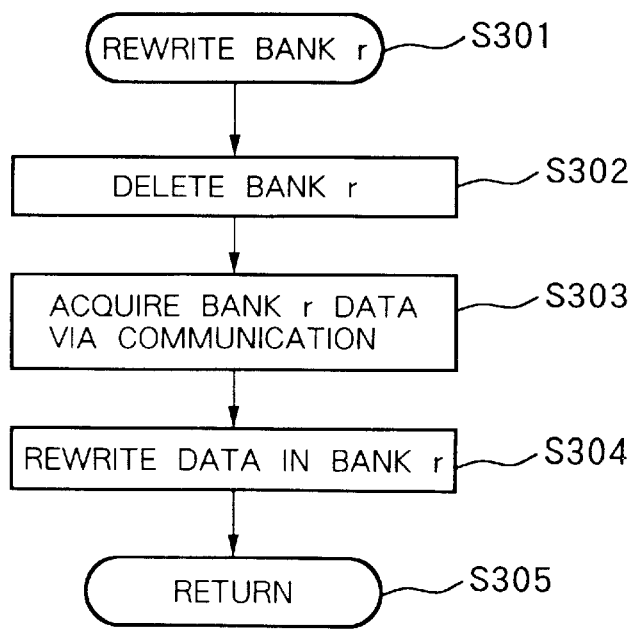
FIG. 5 is a flow chart showing the bank rewrite processing in the first embodiment.

The bank rewrite processing in steps S117 and S118 will be described in detail below with reference to FIG. 5.

In step S301, a rewrite routine of bank r (r is a or b) is started. In step S302, the contents of bank r are simultaneously deleted. In step S303, a new program for rewrite is acquired from the accessory 102 via a communication. In step S304, the program is written in bank r. In step S305, the bank rewrite processing ends, and the control returns to the flow chart shown in FIG. 3.

Upon completion of rewrite of both the banks a 4 and b 5, the control returns to step S102. However, since program alteration in the camera 100 by the combination of the accessory 102 and camera 100 is not required, the processing in step S104 and the subsequent steps is executed in practice.

To restate, according to this embodiment, since any of a plurality of banks in the flash memory can hold a loader in the camera which mounts a microcomputer with an internal flash memory, all program areas on the flash memory are rewritable and, hence, the camera control program can also be rewritten. In this way, in the camera system, version up can be made including the flash memory rewrite control loader.

Especially, upon applying the flash memory control according to this embodiment to a microcomputer such as MC68HC912 or the like available from Motorola, Inc., the program in the microcomputer can rewrite the contents of the flash memory on its own program ROM area, and such processes can be attained independently of I/O port states.

In the description of this embodiment, the number of banks that form the flash memory 3 is 2. Of course, this embodiment can be applied as long as a flash memory having at least two banks can hold a loader in at least two banks.

The camera alteration program held by the FM correction ROM 43 in the accessory 102 is not limited to that for only one model of camera, and programs corresponding to a plurality of models of cameras may be prepared, so that the accessory 102 can be used for a plurality of models of cameras. In such case, the user may select the model on which the accessory 102 is mounted.

Also, a patch program against bugs found as market errors after the release of the camera 100 may be provided to the accessory 102 which is released after the camera 100. With this program, the camera 100 can be debugged by only mounting the accessory 102 without requiring any user's operations.

The user may alter the internal program of the camera 100 to customize his or her camera so as to have his or her own display operability such as custom functions. In such case, the user can alter the program using the alteration system of this embodiment.

Figure 3:
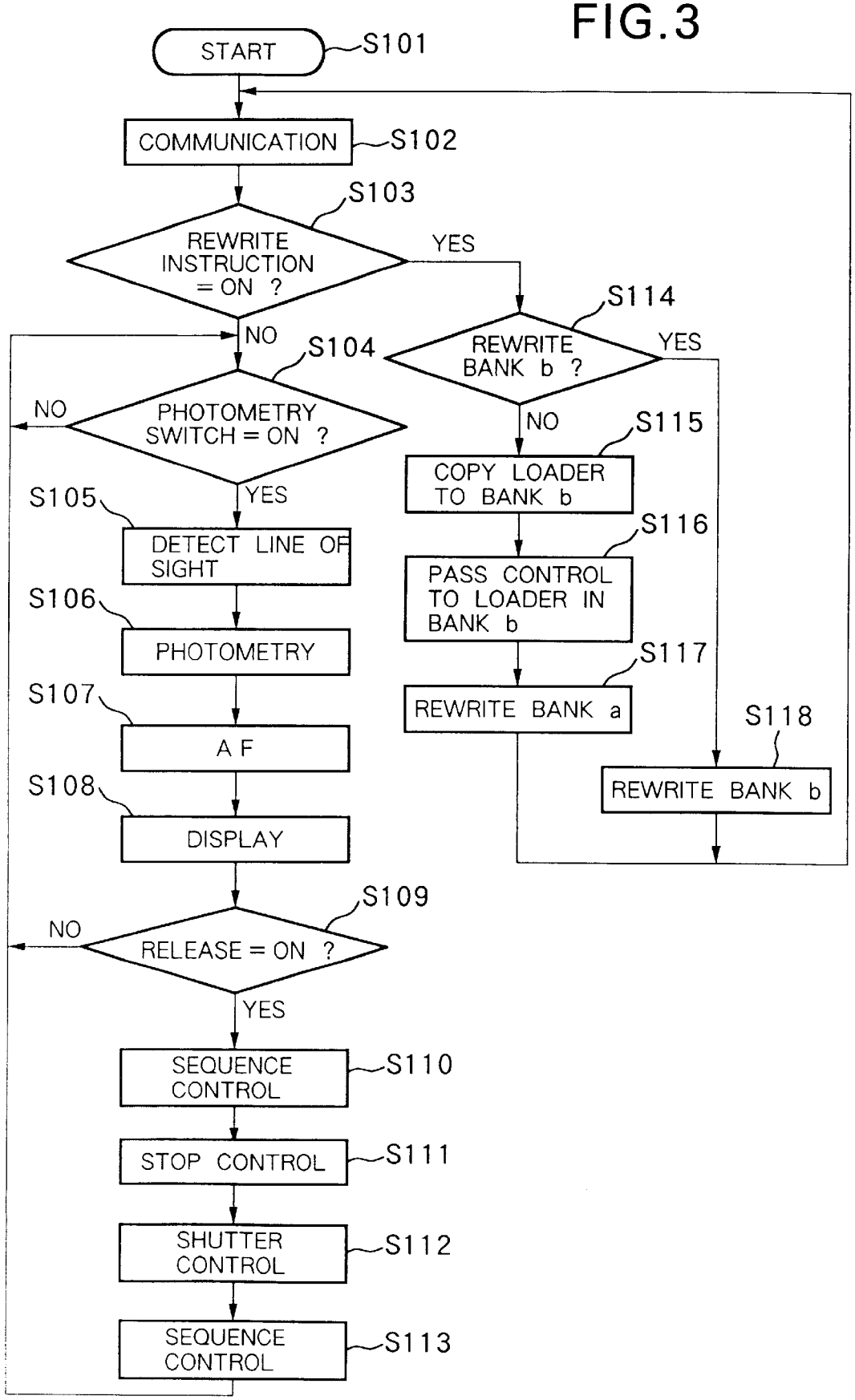
FIG. 3 is a flow chart showing the camera internal processing upon mounting an accessory in the first embodiment.

In this embodiment described above, the loader is copied to bank b in step S115 in FIG. 3. Alternatively, the loader may be pre-stored in bank b. In this case, the loader need not be copied, and the control need only be passed to the loader in bank b in step S116.

Note that this embodiment is not limited to the voice input rear cover 102, and can be applied to various other rear covers that can be attached to the camera 100.

Second Embodiment

The second embodiment according to the present invention will be described below with reference to FIGS. 6 and 7.

The needs for flash memories have grown instead of conventional EEPROMs since the flash memory has a small cell size and an inexpensive large-capacity memory can be obtained. On the other hand, in return for such merits, the flash memory requires a relatively large memory address unit upon deletion. Hence, to prepare a plurality of banks in the flash memory is to divide a chip into a plurality of banks as deletion units. Since this leads to an increase in chip size, such chip having a plurality of banks requires high cost and is rarely put on the market in practice.

In the first embodiment described above, the flash memory of the microcomputer must have two or more banks. In other words, since the flash memory rewrite system described in the first embodiment depends on the hardware arrangement of the flash memory, it is often hard to implement. Furthermore, in order to rewrite the contents of all the areas of the flash memory in the first embodiment, the rewrite process must be executed in units of banks, and complicated process control is required.

In view of the foregoing, the second embodiment is characterized in that a flash rewrite control program (loader) is transferred to an EEPROM or RAM area which has a smaller capacity but higher degree of freedom than a ROM area, and the contents of a flash memory area as a main program area are rewritten from the EEPROM or RAM.

Figure 6:
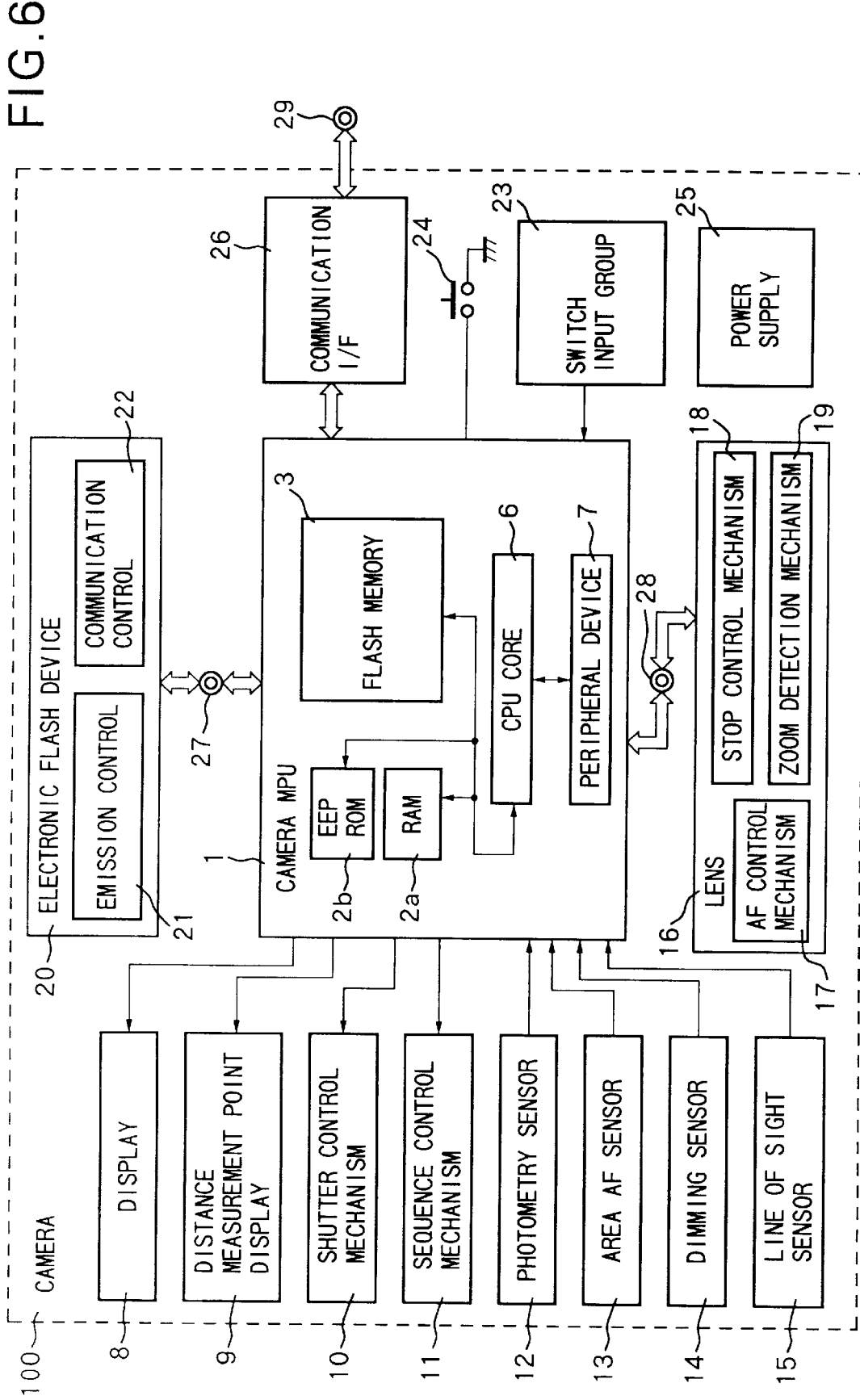
FIG. 6 is a block diagram showing the arrangement of a camera according to the second embodiment of the present invention in detail.

FIG. 6 shows the arrangement of the camera 100 in the second embodiment. Since the arrangement shown in FIG. 6 is substantially the same as that shown in FIG. 2A in the first embodiment, a detailed description thereof will be omitted. Unlike in the first embodiment, the flash memory 3 does not have a plurality of banks.

Figure 7:
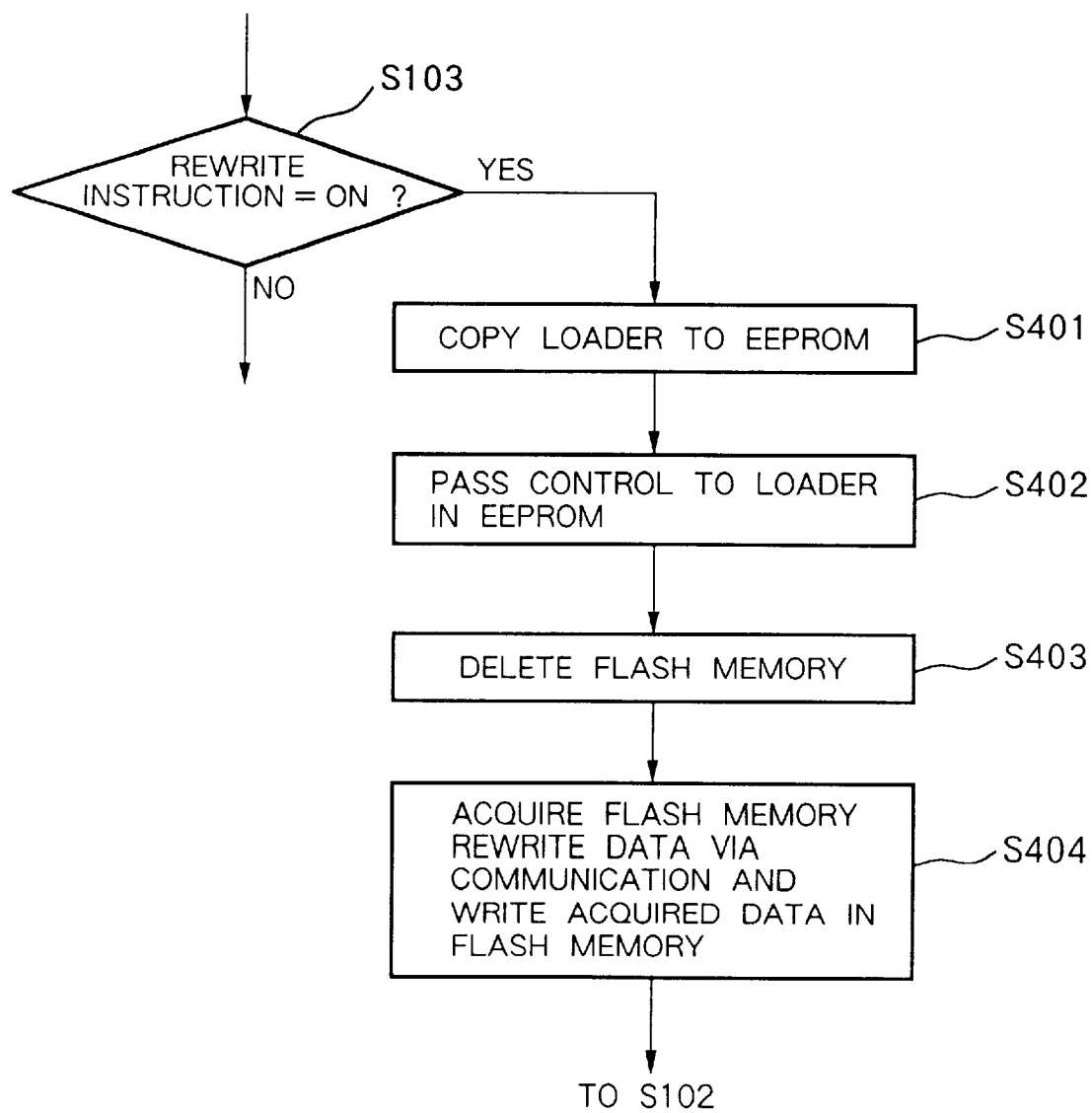
FIG. 7 is a flow chart showing the flash memory write processing using an EEPROM in the second embodiment.

FIG. 7 is a flow chart showing an example of rewriting the contents of the flash memory 3 using an EEPROM 2b. In this case, the processing executed upon mounting a new accessory on the camera is substantially the same as that in the flow chart shown in FIG. 3 in the first embodiment. In this embodiment, however, the processing executed upon reception of a rewrite instruction "ON" in step S103 is as shown in FIG. 7.

If it is determined in step S103 that the rewrite instruction is "ON", the flow advances to step S401 to copy the loader in the flash memory 3 to the EEPROM 2b, and the control is passed to the loader on the EEPROM 2b in step S402. In step S404, rewrite data for the flash memory 3 is acquired via a communication with the accessory 102, and is written in the flash memory 3.

Figure 8:
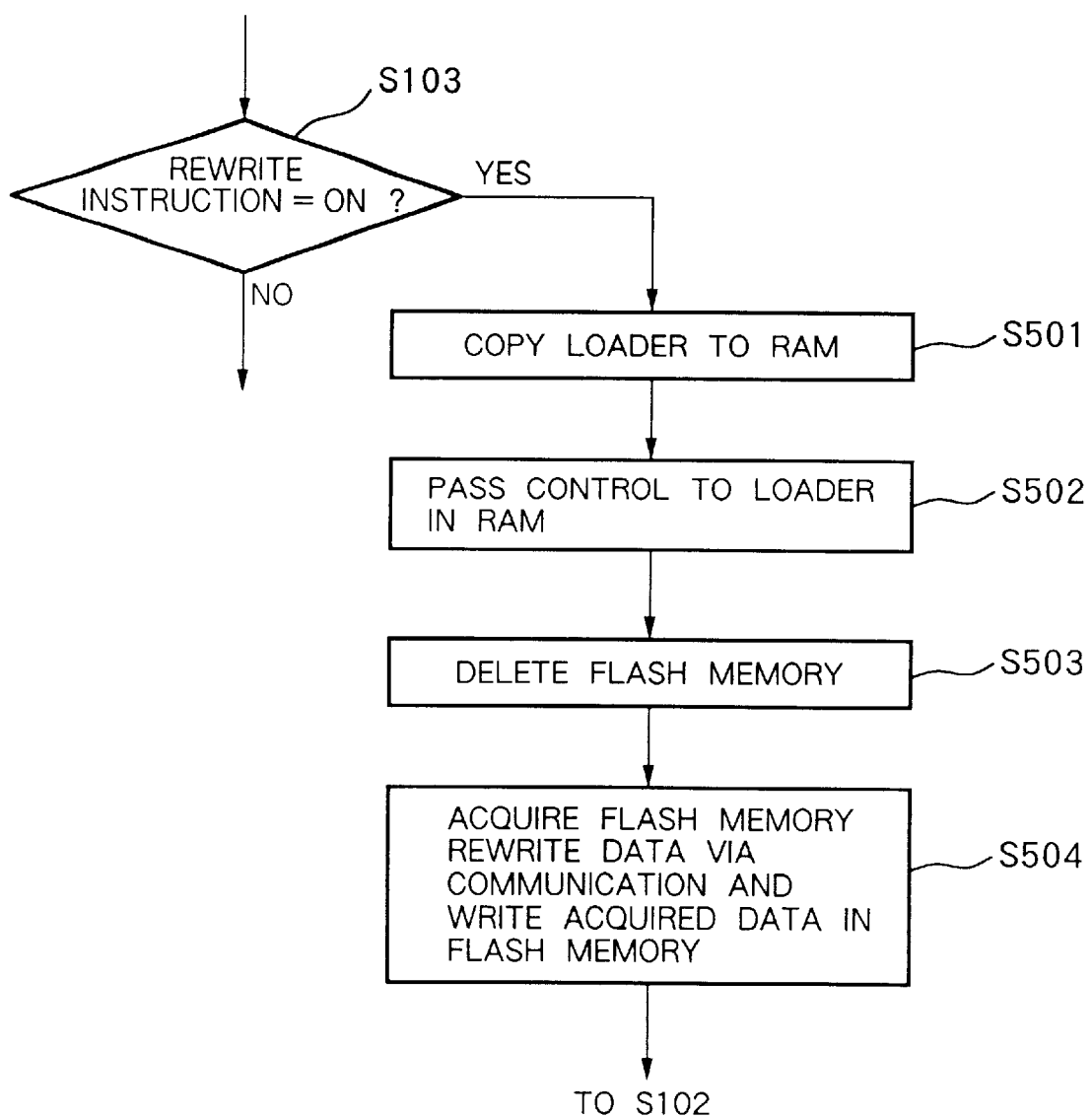
FIG. 8 is a flow chart showing the flash memory write processing using a RAM in the second embodiment.

FIG. 8 is a flow chart showing an example of rewriting the contents of the flash memory 3 using a RAM 2a. If it is determined in step S103 that the rewrite instruction is "ON", the flow advances to step S501 to copy the loader in the flash memory 3 to the RAM 2a, and the control is passed to the loader on the RAM 2a in step S502. In step S503, the contents of the flash memory 3 are simultaneously deleted. In step S504, rewrite data for the flash memory 3 is acquired via a communication with the accessory 102, and is written in the flash memory 3.

In this fashion, when the contents of the flash memory 3 are rewritten using the EEPROM 2b or RAM 2a, the flash memory need only hold one loader, resulting in high memory use efficiency.

When the rewrite process is interrupted by accident, since the contents of the RAM 2a are volatile, such state is very risky especially when the user arbitrarily rewrites the contents of the flash memory. However, upon rewrite using the EEPROM 2b, the loader remains in the EEPROM 2b even when the rewrite process is interrupted. In particular, when a function called a special boot like in MC68HC11 series available from Motorola, Inc. is used, even when a reset vector in the RAM area is destroyed, the system can be re-booted from the EEPROM 2b by external terminal operations, resulting in no risk. However, it is unpreferable in terms of memory use efficiency to assure a free area for the loader in the EEPROM 2b in advance or to pre-store the loader in the EEPROM 2b.

However, since the EEPROM 2b has not only adjustment data for the camera 100 but also a work area as a temporal storage area for status setup values, and the like of the camera 100, such area can be used upon rewriting the flash memory 3.

As described above, according to the second embodiment, all the areas including the control program on the flash memory can be rewritten without using an expensive chip having a plurality of banks as the flash memory.

In order to reduce risk upon rewriting the flash memory 3 in the present invention, a jump vector in the flash memory 3 that indicates a destination to which the control is to be passed should indicate a loader or program which is not present on the area to be rewritten, and is preferably written before other data (first of all) upon rewriting the program.

Another Embodiment

Note that the present invention may be applied to either a system constituted by a plurality of equipments (e.g., a host computer, interface device, reader, printer, and the like), or an apparatus consisting of a single equipment (e.g., a copying machine, facsimile apparatus, or the like).

The objects of the present invention are also achieved by supplying a storage medium, which records a program code of a software program that can realize the functions of the above-mentioned embodiments to the system or apparatus, and reading out and executing the program code stored in the storage medium by a computer (or a CPU or MPU) of the system or apparatus.

In this case, the program code itself read out from the storage medium realizes the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be realized not only by executing the readout program code by the computer but also by some or all of actual processing operations executed by an OS (operating system) running on the computer on the basis of an instruction of the program code.

Furthermore, the functions of the above-mentioned embodiments may be realized by some or all of actual processing operations executed by a CPU or the like arranged in a function extension board or a function extension unit, which is inserted in or connected to the computer, after the program code read out from the storage medium is written in a memory of the extension board or unit.

As many apparently widely different embodiments of the present invention can be made without departing from the spirit and scope thereof, it is to be understood that the invention is not limited to the specific embodiments thereof except as defined in the appended claims.

To restate, according to the present invention, in a camera that mounts a microcomputer with an internal flash memory, the entire program area on the flash memory can be rewritten.

In this manner, program alteration with a very high degree of freedom such as debugging for camera software, customization of display operability in units of users, updating of a flash memory rewrite control loader itself, and the like can be realized in addition to updating of a camera control program and support for a new accessory, thus widely assuring possibility of camera improvements.

What is claimed is:

1. A memory alteration system for a camera which comprises storage means divided into at least two areas,
wherein the at least two areas of said storage means respectively are able to hold control program for altering contents of said storage means, and
wherein, when the control program held in a first area is executed to alter the contents of a second area to a predetermined control program and the said first area is altered using said predetermined control program of the said second area, the contents of all the areas of said storage means are altered.

2. The system according to claim 1, wherein said storage means comprises a flash memory, which has a plurality of banks including first and second banks.

3. The system according to claim 2, wherein said plurality of banks are independently erasable and writable.

4. The system according to claim 3, wherein the control program is a loader program for controlling rewrite of said flash memory.

5. The system according to claim 4, wherein contents of said second bank are altered by executing a loader program held in said first bank.

6. The system according to claim 5, wherein contents of the first bank are altered by executing a loader program held in said second bank.

7. The system according to claim 6, wherein the loader programs held in said first and second banks are identical.

8. The system according to claim 7, wherein the loader program held in said second bank is generated by copying the loader program held in said first bank.

9. The system according to claim 7, wherein the loader programs held in said first and second banks can be copied to each other.

10. The system according to claim 2, wherein said camera further comprises connection means for connecting an external device, and
data held in said external device is written in said flash memory by executing the control program.

11. The system according to claim 10, wherein said external device holds a program for making said camera compatible with said external apparatus, and
the program held in said external device is written in said flash memory by executing the control program.

12. The system according to claim 11, wherein said external device is a camera accessory.

13. A memory alteration system for a camera which comprises first storage means and a re-bootable EEPROM,
wherein said first storage means holds a control program for altering contents thereof, and
the contents of all areas of said first storage means are altered by copying the control program to said re-bootable EEPROM and executing the copies control program.

14. The system according to claim 13, wherein said first storage means comprises a flash memory.

15. The system according to claim 14, wherein said camera further comprises connection means for connecting an external device, and
data held in said external device is written in said flash memory by executing the control program.

16. The system according to claim 15, wherein said external device holds a program for making said camera compatible with said external apparatus, and
the program held in said external device is written in said flash memory by executing the control program.

17. The system according to claim 16, wherein said external device is a camera accessory.

18. The system according to claim 13, wherein said control program is copied to a work area of said re-bootable EEPROM.

19. The system according to claim 18, wherein said work area is a temporary storage area for status setup values of the camera.

20. The system according to claim 13, wherein said re-bootable EEPROM comprises a terminal for re-booting.

21. A memory alteration method for a camera which comprises storage means divided into at least first and second areas,
wherein said first and second areas respectively are able to hold a control program for altering contents of said storage means,
contents of said second area are altered by executing the control program held in the first area, and
contents of said first area are altered by executing the control program held in the second area.

22. The method according to claim 21, wherein said storage means comprises a flash memory, which has a plurality of banks including first and second banks.

23. The method according to claim 22, wherein the control program is a loader program for controlling rewrite of said flash memory.

24. The method according to claim 23, wherein the loader programs held in said first and second banks are identical.

25. The method according to claim 24, wherein the loader program held in said second bank is generated by copying the loader program held in said first bank.

26. The method according to claim 24, wherein the loader programs held in said first and second banks can be copied to each other.

27. The method according to claim 22, wherein said camera further comprises connection means for connecting an external device, and
data held in said external device is written in said flash memory by executing the control program.

28. The method according to claim 27, wherein said external device holds a program for making said camera compatible with said external apparatus, and
the program held in said external device is written in said flash memory by executing the control program.

29. The method according to claim 28, wherein said external device is a camera accessory.

30. A memory alteration method for a camera which comprises first storage means and a re-bootable EEPROM,
wherein said first storage means holds a control program for altering contents thereof, and copies the control program to said re-bootable EEPROM,
alteration control of said first storage means is passed to the control program copied to said re-bootable EEPROM, and
the contents of all areas of said first storage means are altered by the copied control program.

31. The method according to claim 30, wherein said first storage means comprises a flash memory.

32. The method according to claim 31, wherein said camera further comprises connection means for connecting an external device, and data held in said external device is written in said flash memory by executing the control program.

33. The method according to claim 32, wherein said external device holds a program for making said camera compatible with said external apparatus, and the program held in said external device is written in said flash memory by executing the control program.

34. The method according to claim 33, wherein said external device is a camera accessory.

35. The method according to claim 30, wherein said control program is copied to a work area of said re-bootable EEPROM.

36. The method according to claim 35, said work area is a temporary storage area for status setup values of the camera.

37. The method according to claim 30, wherein said re-bootable EEPROM comprises a terminal for re-booting.

38. A camera comprising:

storage means divided into at least two areas, wherein the at least two areas of said storage means respectively are able to hold a control program for altering contents of said storage means, and when the control program held in a first area is executed to alter the contents of a second area to a predetermined control program then altering said first area using said predetermined control program of said second area, the contents of all the areas of said storage means are altered.

39. The camera according to claim 38, wherein said storage means comprises a flash memory, which has a plurality of banks including first and second banks.

40. The camera according to claim 39, further comprising connection means for connecting an external device, and wherein data held in said external device is written in said flash memory by executing the control program.

41. A camera comprising:

first storage means and a re-bootable EEPROM, wherein said first storage means holds a control program for altering contents thereof, and the contents of all areas of said first storage means are altered by copying the control program to said re-bootable EEPROM and executing the copied control program.

42. The camera according to claim 41, wherein said first storage means comprises a flash memory.

43. The camera according to claim 42, further comprising connection means for connecting an external device, and wherein data held in said external device is written in said flash memory by executing the control program.

44. The camera according to claim 41, wherein said control program is copied to a work area of said re-bootable EEPROM.

45. The camera according to claim 44, wherein said work area is a temporary storage area for status setup values of the camera.

46. The camera according to claim 41, wherein said re-bootable EEPROM comprises a terminal for re-booting.

47. A recording medium which records a program code for memory alteration in a camera which comprises storage means divided into at least first and second areas the respectively are able to hold a control program for altering contents of said storage means, said program code including:

a code of altering contents of said second area by executing the control program held in said first area, and a code of altering contents of said first area by executing the control program held in said second area.

48. A recording medium which records a program code for memory alteration in a camera which comprises first storage means and re-bootable EEPROM, and in which said first storage means holds a control program for altering contents thereof, said program code including:

a code of copying the control program to said re-bootable EEPROM;

a code of passing alteration control of said first storage means to the control program copied to said re-bootable EEPROM; and a code of altering contents of all areas of said first storage means by executing the copied control program.

49. The recording medium according to claim 48, wherein said control program is copied to a work area of said re-bootable EEPROM.

50. The recording medium according to claim 49, wherein said work area is a temporary storage area for status setup values of the camera.

51. The recording medium according to claim 48, wherein said re-bootable EEPROM comprises a terminal for re-booting.

* * * * *

UNITED STATES PATENT AND TRADEMARK OFFICE
CERTIFICATE OF CORRECTION

PATENT NO. : 6,195,511 B1
DATED : February 27, 2001
INVENTOR(S) : Yoshihito Harada It is certified that error appears in the above-identified patent and that said Letters Patent is hereby corrected as shown below:

<u>Column 8,</u>
Line 17, delete "up" and substitute therefor -- update --.

<u>Column 14, claim 47,</u>
Line 15, delete "the" and substitute therefor -- that --.

Signed and Sealed this

Eighteenth Day of September, 2001

Attest:

*Nicholas P. Godici*

NICHOLAS P. GODICI
*Acting Director of the United States Patent and Trademark Office*

*Attesting Officer*